(12) United States Patent
Paila

(10) Patent No.: US 7,426,393 B2
(45) Date of Patent: Sep. 16, 2008

(54) METHOD AND SYSTEM OF IDENTIFYING NETWORK SERVICES

(75) Inventor: Toni Paila, Degerby (FI)

(73) Assignee: Nokia Corporation, Epsoo (FI)

( * ) Notice: Subject to any disclaimer, the term of this patent is extended or adjusted under 35 U.S.C. 154(b) by 1162 days.

(21) Appl. No.: 09/988,921

(22) Filed: Nov. 19, 2001

(65) Prior Publication Data

US 2003/0096614 A1 May 22, 2003

(51) Int. Cl.
*H04Q 7/20* (2006.01)
*H04L 12/26* (2006.01)

(52) U.S. Cl. .............. 455/450.1; 455/414.1; 370/235

(58) Field of Classification Search ........... 455/450, 455/437–439, 440, 445, 451, 456.1, 456.4, 455/456.3, 456.5, 456.6, 466, 7, 8, 9, 14, 455/17, 18, 41.2, 44, 45, 500, 512, 517, 435.1, 455/45.1, 414.1, 506, 436, 442; 713/163; 370/331, 390, 334, 235, 437

See application file for complete search history.

(56) References Cited

U.S. PATENT DOCUMENTS

| 5,459,458 | A | | 10/1995 | Richardson et al. |
| 5,799,251 | A | * | 8/1998 | Paavonen .................... 455/517 |
| 5,909,651 | A | * | 6/1999 | Chander et al. ............. 455/466 |
| 5,999,216 | A | | 12/1999 | Kaars |
| 6,061,095 | A | | 5/2000 | Van Gestel |
| 6,100,884 | A | | 8/2000 | Tomita et al. |
| 6,108,706 | A | * | 8/2000 | Birdwell et al. ............. 709/229 |
| 6,122,660 | A | | 9/2000 | Baransky et al. |
| 6,128,490 | A | | 10/2000 | Shaheen et al. |
| 6,163,345 | A | | 12/2000 | Noguchi et al. |
| 6,192,340 | B1 | * | 2/2001 | Abecassis .................... 704/270 |
| 6,233,736 | B1 | * | 5/2001 | Wolzien ..................... 725/110 |
| 6,301,609 | B1 | | 10/2001 | Aravamudan et al. |
| 6,351,647 | B1 | * | 2/2002 | Gustafsson ................. 455/466 |
| 6,463,585 | B1 | * | 10/2002 | Hendricks et al. ............. 725/35 |
| 6,519,455 | B1 | * | 2/2003 | McCormick et al. ........ 455/438 |
| 6,532,368 | B1 | * | 3/2003 | Hild et al. .................... 455/515 |
| 2001/0014611 | A1 | * | 8/2001 | Dufort ........................ 455/517 |

(Continued)

FOREIGN PATENT DOCUMENTS

WO  WO9111868  8/1991

(Continued)

OTHER PUBLICATIONS

ISO/IEC 13818-1 "Information technology—Generic coding of moving pictures and associated audio information—Part I: Systems", Nov. 13, 1994, 135 pages.

(Continued)

*Primary Examiner*—Naghmeh Mehrpour
(74) *Attorney, Agent, or Firm*—Morgan & Finnegan, L.L.P.

(57) ABSTRACT

A method and apparatus for transmitting and accessing announcement information identifying available services. Services are provided on the network over a plurality of communication channels, such that each channel is associated with at least one service. At least one of the plurality of communication channels is dedicated as an all-announcement channel, which includes a service announcement for each one of the services available on the plurality of communication channels. Redirection information is also present on the plurality of communication channels and is used to redirect the mobile terminal to the all-announcement channel to obtain information concerning the available services.

64 Claims, 8 Drawing Sheets

U.S. PATENT DOCUMENTS

| | | | |
|---|---|---|---|
| 2002/0009993 A1* | 1/2002 | Dastrup et al. | 455/431 |
| 2002/0077077 A1 | 6/2002 | Rezvani et al. | |
| 2002/0102967 A1 | 8/2002 | Chang et al. | |
| 2002/0136390 A1 | 9/2002 | Lang et al. | |
| 2002/0167921 A1* | 11/2002 | Vakil et al. | 370/331 |
| 2002/0187784 A1* | 12/2002 | Tigerstedt et al. | 455/439 |
| 2003/0003909 A1* | 1/2003 | Keronen et al. | 455/434 |
| 2003/0003964 A1 | 1/2003 | Wroblewski | |
| 2003/0016702 A1* | 1/2003 | Bender et al. | 370/522 |
| 2003/0142757 A1* | 7/2003 | Kahlman et al. | 375/295 |

FOREIGN PATENT DOCUMENTS

| | | |
|---|---|---|
| WO | WO9922539 | 5/1999 |
| WO | WO 01/74108 A1 | 10/2001 |
| WO | WO 01/76286 A1 | 10/2001 |
| WO | WO0180579 | 10/2001 |

OTHER PUBLICATIONS

Finlayson R., "Describing Session Directories in SDP" (Internet Draft) IETF, Jan. 2001, 18 pages.

Santos A., Macedo J., Freitas V., "Towards multicast session directory services", 7 pages.

Maher M. P., Perkins C & Whelan E. "Session Announcement Protocol" (RFC 2974) IETF, Oct. 2000, 18 pages.

Handley, M& Jacobson V. "SDP: Session Description Protocol" (RFC 2327) IETF, Apr. 1998, 42 pages.

EN 300 468 V1.4.1, "Specification for Service Information (SI) in DVB systems", ETSI, Nov. 2000, 83 pages.

Perkins, C "IP Mobility Support" (RFC 2002) IETF, Oct. 1996, 79 pages.

Supplementary European Search Report of European Application No. 02803487.4—Date Feb. 6, 2007.

* cited by examiner

METHOD AND SYSTEM OF IDENTIFYING NETWORK SERVICES

FIELD OF THE INVENTION

The present invention relates to the transmission of network service data to a mobile terminal and more particularly, to the transmission of service data to mobile terminals in a multi-bearer network.

BACKGROUND OF THE INVENTION

A multi-bearer network ("MBN"), is a network having the capability to transmit a data packet via one of several alternative bearer network types to mobile terminals. Each mobile terminal is preferably able to communicate with a plurality of bearer networks ("BN"). The bearer networks are known to one skilled in the art and typically comprise at least one bi-directional bearer network (e.g., GSM, GPRS, UMTS, WLAN, Bluetooth, etc.) and at least one unidirectional or broadcast bearer network (e.g., DAB, DVB, etc.). The DAB and DVB broadcast bearer networks are commonly referred to as DxB. The DxB networks are the principal bearer networks for down-link traffic. A mobile terminal uses the bi-directional (uplink) bearer network primarily for accessing the services of the DxB networks, although some bi-directional bearer networks, most notably UMTS, can be used for down-link traffic at a moderately high speed. Moreover, the other bi-directional bearer networks mentioned above may be used to transmit services that do not require significant bandwidth. The bearer networks are geographically overlapping, and a mobile terminal may have access to all bearer networks simultaneously. MBN's are well-known and described in detail in WO 01/76286 A1, entitled "Architecture and Packet Routing in a Multi-Bearer Type Network" and WO 01/74108 A1, entitled "Handover in a Wireless Mobile IP Network", copies of which are incorporated herein by reference.

FIG. 1 shows an exemplary bearer network A 100*a* and an exemplary bearer network B 100*b* of a Multi-Bearer Network 100 (MBN), having at least one transmitter 102*a* for use in transmitting service data from bearer network A 100*a*, and having at least one transmitter 102*b* for use in transmitting service data from bearer network B 100*b*, to at least one mobile terminal 104. Service data may include streaming MP3 data, periodically updated weather reports sent over IP, IP services such as multicast services or unicast services, cell to session mappings or IP component mappings, or the like. Bearer network A 100*a* packetizes its respective service data and sends it (step 101*a*) to at least one transmitter 102*a* for transmission to the mobile terminal 104 in a manner well known to those skilled in the art. Additionally, bearer network B 100*b* also packetizes its respective service data and sends it (step 101*b*) to at least one transmitter 102*b* for transmission to the mobile terminal 104 in a manner well known to those skilled in the art. The mobile terminal 104 may be capable of receiving packetized service data from only a single bearer in the network or, alternatively, may be a "hybrid" terminal capable of receiving packetized service data from a plurality of bearer networks in a MBN 100.

Each multi bearer network 100 that transmits service data, typically does so on a plurality of channels, where each service is assigned to a particular channel. A channel may be a frequency, a program identifier ("PIED"), a media access control ("MAC") address, or the like. In addition to the service data, the multi bearer network 100 also transmits service announcements to enable a mobile terminal 104 to identify the service that a multi-bearer network 100 is transmitting on a channel. Several methods of transmitting service announcements have been proposed. FIG. 2 illustrates one such method, wherein a multi-bearer network 100 uses X channels 200 to transmit service data to a mobile terminal 104. It is assumed that each mobile terminal 104 initially tunes to a random channel upon powering up. The channel may be a specific frequency, but need not be so limited. As shown in FIG. 2, for each channel, a service "S" and a service announcement "A" identifying the service are transmitted on the same channel. In other words, the service $S_1$ and the service announcement $A_1$ identifying $S_1$ are transmitted on channel 1, the service $S_2$ and the service announcement $A_2$ identifying $S_2$, are transmitted on channel 2, etc. In order to identify the services available on all X channels 200, the mobile terminal 104 will tune to a first channel, access the service announcement on the channel, identify the service available on that channel, and then tune to another channel to determine the service available on that channel. This process of tuning, accessing and re-tuning is repeated until all channels carrying services that the mobile terminal 104 is able to receive have been tuned to, and their respective services identified. Assuming that it requires "Y" seconds to identify the services available on a given channel, and that it requires "T" seconds to jump from one channel to another channel, then the total learning time "t" for the mobile terminal 104 to identify all of the services available is $t=X*(Y+T)$ seconds.

FIG. 3 illustrates another exemplary method of transmitting service announcements. As shown in FIG. 3, a multi-bearer network 100 uses X channels 300 to transmit service data to a mobile terminal 104. As in the previous method, the mobile terminal 104 initially tunes to a random channel upon powering on. Unlike the previous method, however, one channel contains all of the service announcements, $A_1$ through $A_X$, for all X channels 300 that provide a service, $S_1$ through $S_X$, respectively. This channel is referred to as the "all-announcement" channel 301. The probability that the mobile terminal 104 will randomly select the all-announcement channel 301 is 1/X, assuming that the process of selecting a channel is truly random. As in the method of FIG. 2, the mobile terminal 104 tunes to each channel for Y seconds to determine if it has tuned to the all-announcement channel 301. The time required for the mobile terminal 104 to tune from one channel to another channel is T seconds. Therefore, the minimum learning time, defined as "$t_{min}$", is greater than or equal to Y seconds, and the maximum learning time, "$t_{max}$" is less than or equal to $X*(Y+T)$ seconds. Taking the average of $t_{min}$ and $t_{max}$ to be the expected learning time for the mobile terminal 104 to identify the all-announcement channel 301, the expected learning time is $(Y+X*(Y+T))/2$. This, however, results in only a marginal improvement in minimizing the expected learning time.

FIG. 4 illustrates yet another exemplary method of transmitting service announcements. In FIG. 4, there are X channels 400. Each channel, however, contains the service announcements, $A_1$ through $A_X$, for all of the services $S_1$ through $S_X$ provided on the X channels. In other words, channel 1 contains the service announcements $A_1$ through $A_X$, for channel 1 through X respectively, along with the service $S_1$ for channel 1, channel 2 contains the service announcements, $A_1$ through $A_X$, for channel 1 through X, along with the service $S_2$ for channel 2, etc. Therefore, the channel that the mobile terminal 104 initially selects upon being powered on will contain all of the necessary service announcements. This eliminates the additional learning time associated with the methods discussed above in connection with FIGS. 2 and 3. However, in the method of FIG. 4, the additional bandwidth that the service announcements, $A_1$ through $A_X$, consume is significant, as can readily be seen by comparing FIGS. 2-4.

Solutions other than those discussed above are less automated. For example, in many European countries, such as Italy, upon leaving an airplane and turning on a mobile phone, the user will receive an Short Messaging Service (SMS) message from the network operator such as "Call 12233 to get information on services in Italy". The user can then call the number provided to receive information on the available services.

It is clear that there is a need to overcome the inefficiency of the aforementioned methods.

SUMMARY OF THE INVENTION

The above-identified problems are solved and a technical advance is achieved in the art by providing an apparatus and method for providing service announcement information to a mobile terminal.

An exemplary method of providing service announcement information includes: transmitting a service on a first channel; and transmitting pointer data on the first channel, wherein the pointer data identifies a second channel on which a service announcement identifying the service transmitted on the first channel is located.

In another embodiment, an exemplary method includes: transmitting a service on each of a plurality of channels; and transmitting pointer data on each of the plurality of channels, wherein the pointer data identifies a channel containing a plurality of service announcements identifying the services transmitted on each of the plurality of channels.

In yet another embodiment, an exemplary method of providing service announcement information includes: transmitting a service using a first protocol together with first pointer data on each of a first plurality of channels, the first pointer data identifying a first channel containing a plurality of service announcements identifying the services transmitted on each of the first plurality of channels; and transmitting a service using a second protocol together with second pointer data on each of a second plurality of channels, the second pointer data identifying a second channel containing a plurality of service announcements identifying the services transmitted on each of the second plurality of channels.

In an additional embodiment, an exemplary method of providing a service announcement includes: transmitting a service using a first protocol on each of a first plurality of channels; transmitting pointer data on each of the first plurality of channels; transmitting a service using a second protocol on each of a second plurality of channels; and transmitting pointer data on each of the second plurality of channels, wherein the pointer data identifies a channel containing a plurality of service announcements identifying the services transmitted on the first plurality of channels and on the second plurality of channels.

In an embodiment directed to a method of accessing a communication channel from a plurality of communication channels within a network with a mobile terminal capable of receiving at least one signal from at least one of the communications channels within the network, an exemplary method includes: identifying at least one communication channel that is transmitting signals receivable by the mobile terminal; accessing a first communication channel that is transmitting at least one signal receivable by the mobile terminal; receiving first signals from the first communications channel; searching in the first signals for redirection information; selecting and accessing a second communication channel from the plurality of communication channels based on the redirection information, if the redirection information is received within a first period of time; and selecting and accessing a third communication channel if the redirection information is not received within the first period of time.

In an alternate embodiment, an exemplary method of accessing a communications frequency from a plurality of communications frequencies within a network with a mobile terminal capable of receiving at least one signal from at least one of the communications frequencies within the network includes: identifying at least one communication frequency that is transmitting signals receivable by the mobile terminal; accessing a first communication frequency that is transmitting at least one signal receivable by the mobile terminal; receiving first signals from the first communications frequency; searching in the first signals for redirection information; selecting and accessing a second communication frequency from the plurality of communication channels based on redirection information, if the redirection information is received within a first period of time; and selecting and accessing a third communication frequency if the redirection information is not received within the first period of time.

Other embodiments of the present invention are directed to an article of manufacture comprising a computer readable medium including instructions for performing methods disclosed herein.

An exemplary article of manufacture comprises a computer readable medium including instructions for: identifying at least one communication channel that is transmitting signals receivable by the mobile terminal; accessing a first communication channel that is transmitting at least one signal receivable by the mobile terminal; receiving first signals from the first communications channel; searching in the first signals for redirection information; selecting and accessing a second communication channel from a plurality of communication channels based on the redirection information, if the redirection information is received within a first period of time; and selecting and accessing a third communication channel if the redirection information is not received within the first period of time.

Another exemplary article of manufacture comprises a computer readable medium including instructions for: identifying at least one communication frequency that is transmitting signals receivable by the mobile terminal; accessing a first communication frequency that is transmitting at least one signal receivable by the mobile terminal; receiving first signals from the first communications frequency; searching in the first signals for redirection information; selecting and accessing a second communication frequency from a plurality of communication frequencies based on redirection information, if the redirection information is received within a first period of time; and selecting and accessing a third communication frequency if the redirection information is not received within the first period of time.

Other and further aspects of the present invention will become apparent during the course of the following description and by reference to the attached drawings.

BRIEF DESCRIPTION OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE INVENTION

Referring now to FIGS. 5-8, wherein similar components are referenced in like manner, various embodiments of a method for transmitting and receiving service announcements are disclosed.

Figure 5:
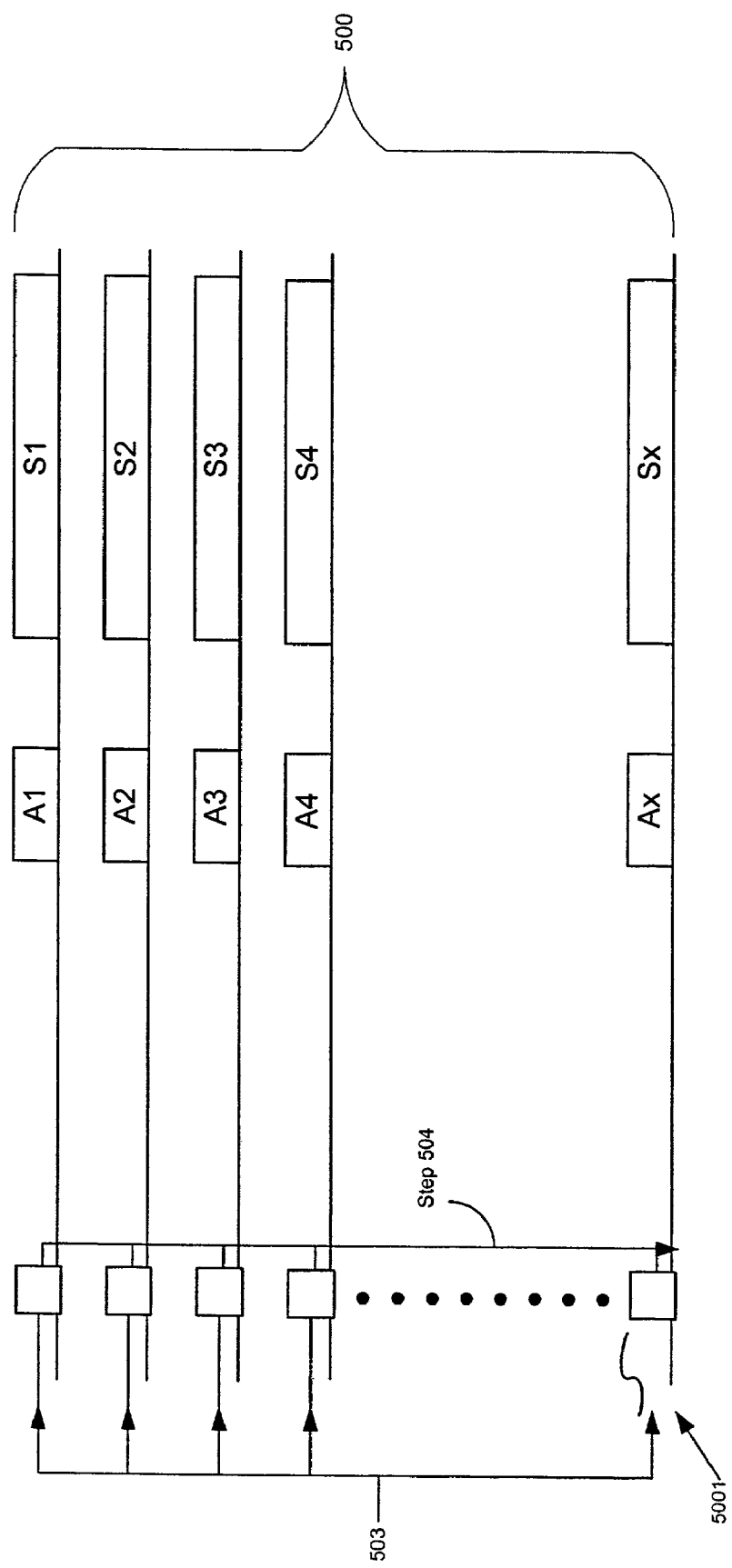
FIG. 5 illustrates an exemplary method of transmitting service announcements in accordance with one embodiment of the present invention.

FIG. 5 illustrates an exemplary method of transmitting service announcements in accordance with one embodiment of the present invention. As shown in FIG. 5, services $S_1$ through $S_X$ are transmitted by a bearer network on channels 1 through X, respectively, together with service announcements $A_1$ through $A_X$, respectively. As mentioned above, a service may include audio, video, text, streaming MP3 data, periodically updated weather reports sent over IP, IP services such as multicast services or unicast services, cell to session mappings or IP component mappings, or the like.

It should be understood, however, that not every channel need be allocated a service, and in addition, that every channel need not include an announcement message identifying the service available on that channel. In addition, the bearer network also transmits redirection information 503 on each of channels 1 through X as will be discussed in detail hereinafter. A mobile terminal 104 is that is equipped with the capability to receive transmissions from the bearer network randomly tunes to a channel from the X available channels 500 when powered on. Moreover, one of the channels 1 through X (in FIG. 5, channel X) is an "all-announcement" channel 5001, which includes a transmission of all the service announcements $A_1$ through $A_X$ for all of the services $S_1$ through $S_X$ available on channels 1 through X. Regardless of the channel selected, the mobile terminal 104 will receive redirection information 503 (e.g. pointer data) which will enable it to tune to the all-announcement channel 5001 (step 504). The redirection information is preferably bearer network-specific, as will be discussed in connection with FIG. 6. The protocols used to redirect the mobile terminal 104 to the all-announcement channel and the protocols used to transmit the service announcements may be any one of the SAP/SDP, SAP XML or RTSP protocols. Once the mobile terminal 104 has tuned to the all-announcement channel 5001, it receives the service announcements identifying all services and the channel on which each service is available. The mobile terminal 104 may then select a service, causing the mobile terminal 104 to tune to the channel on which the selected service is available.

Define the amount of time it takes for the mobile terminal 104 to determine if it is receiving the all-announcement channel as Y seconds, and the time required to tune from one channel to another channel as T seconds. If the mobile terminal 104 randomly selects the all-announcement channel 5001, the, the learning time for the mobile terminal 104 to determine the all-announcement channel 5001 is Y seconds, and may be considered a minimum learning time. In the event that the mobile terminal 104 has not arbitrarily chosen the all-announcement channel 5001 initially, then the redirection information 503 of that channel redirects the mobile terminal 104 (step 504) to the all-announcement channel 5001. In this case, the learning time for the mobile terminal 104 to determine the all-announcement channel 5001 is 2Y+T seconds, and may be considered a maximum learning time. If the expected learning time for the mobile terminal 104 is defined to be the average of the minimum learning time and the maximum learning time, then the expected learning time is (3Y+T)/2. Furthermore, the additional bandwidth consumed by the redirection information 503 is negligibly small with respect to that consumed by the service announcements, defined as W.

Figure 1:
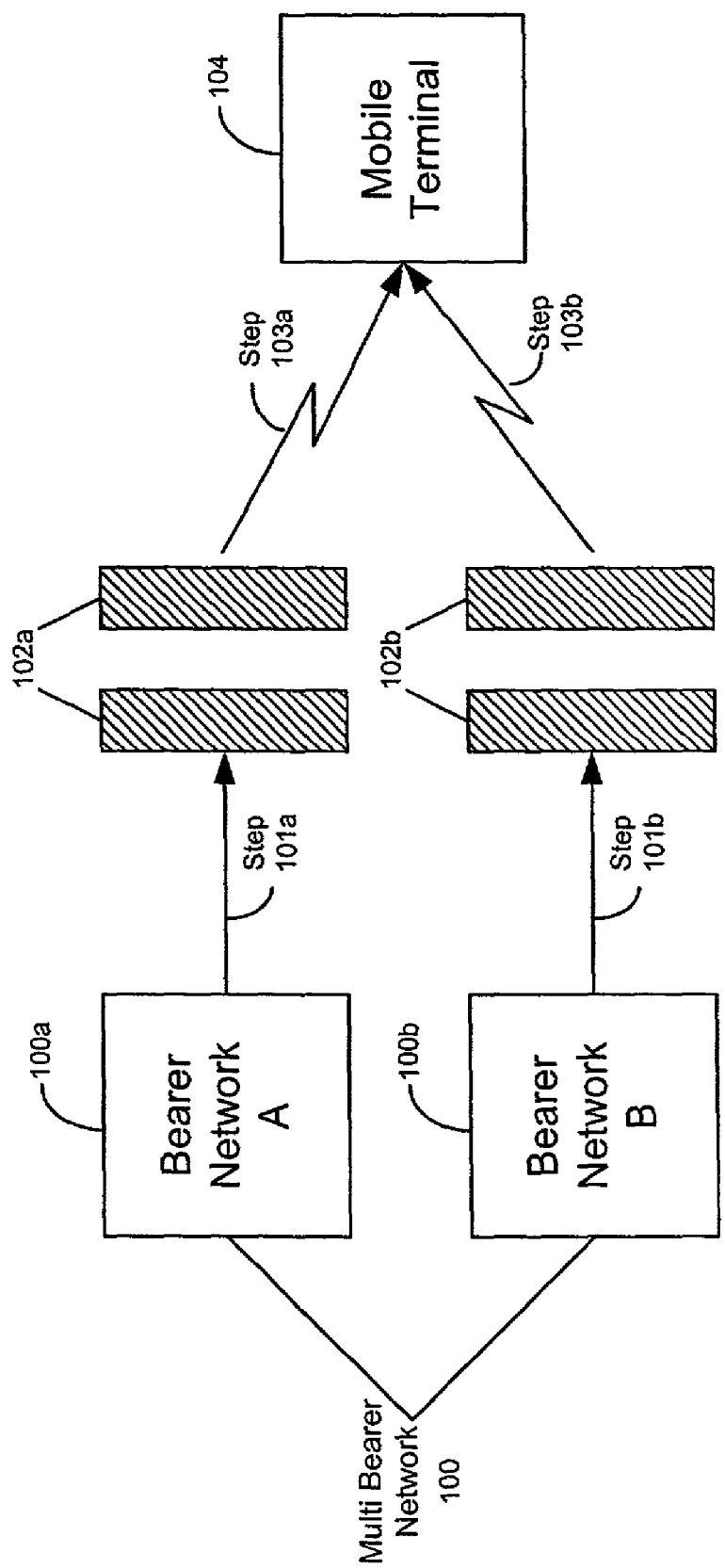
FIG. 1 shows an exemplary multi-bearer network, wherein the process of the present invention may be performed.
Figure 2:
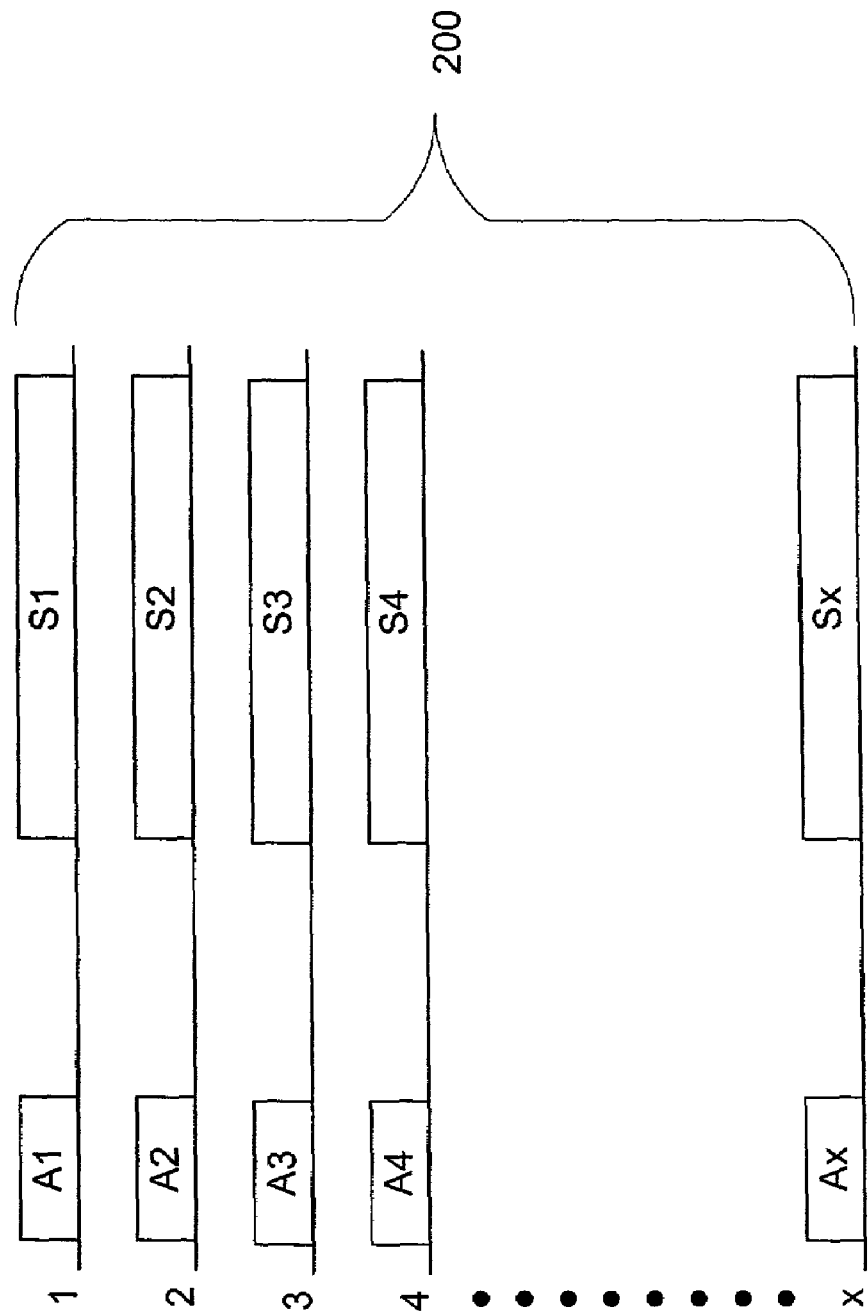
FIG. 2 illustrates an exemplary method of transmitting service announcements in the network of FIG. 1.
Figure 3:
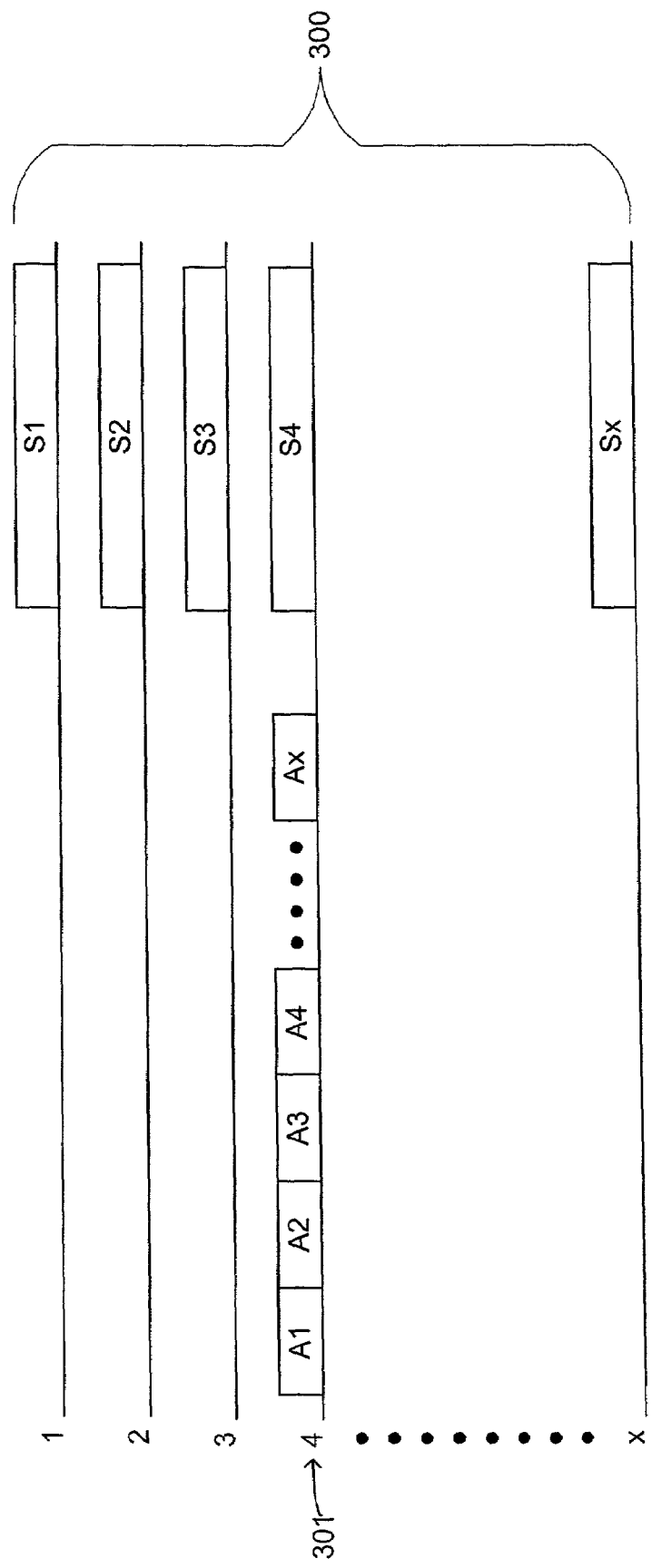
FIG. 3 illustrates another exemplary method of transmitting service announcements in the network of FIG. 1.
Figure 4:
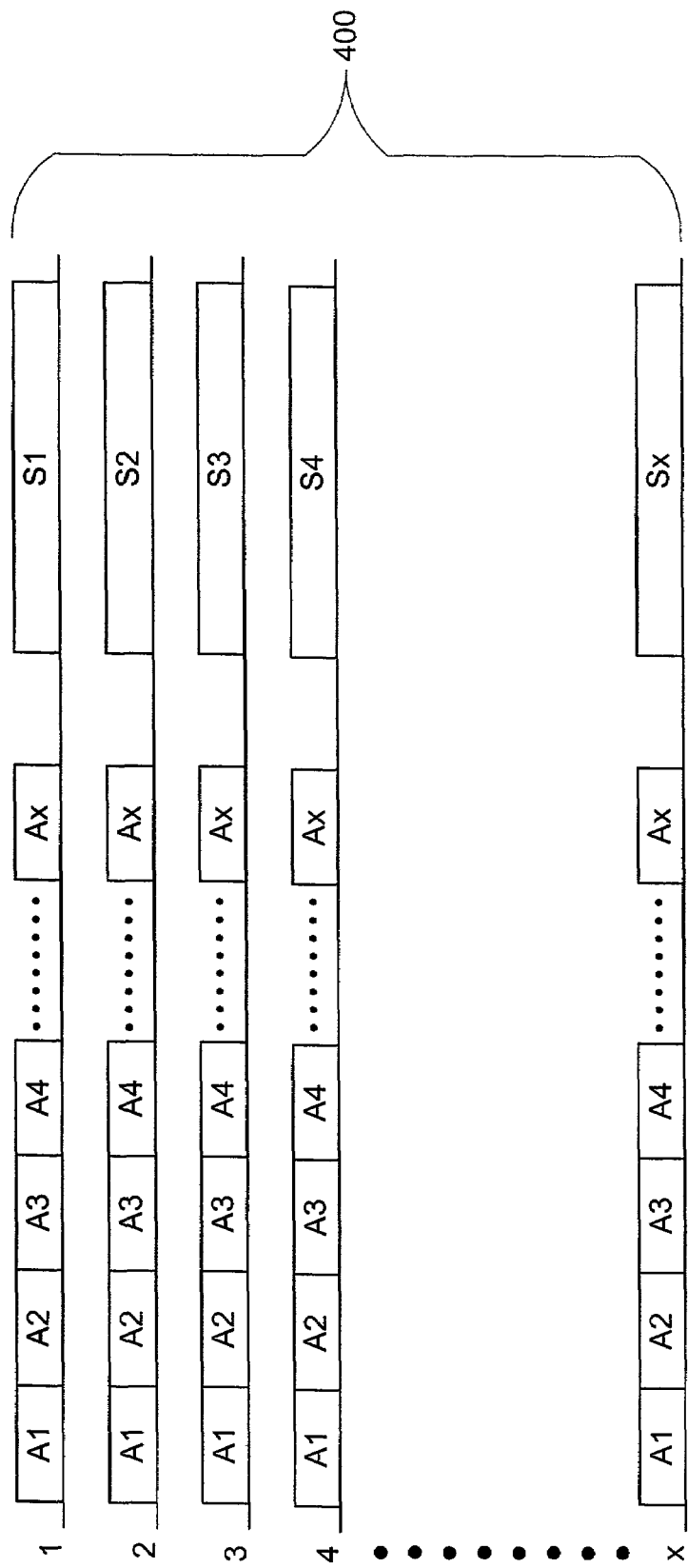
FIG. 4 illustrates yet another method of transmitting service announcements in the method of FIG. 1.

The expected learning time for the method illustrated in FIG. 5 is only slightly larger than that of the solution shown in FIG. 4, which has the smallest learning time of all of the methods illustrated in FIGS. 2-4. However, the additional bandwidth consumed by the service announcements as illustrated in FIG. 4 is very large, being W*X, as opposed to the additional bandwidth consumed by the method illustrated in FIG. 5, being W. Thus, the method of FIG. 5 is clearly an advantageous method for transmitting service announcements over a bearer network Additionally, the efficiency of the method illustrated in FIG. 5 increases as more channels are transmitting service data that the mobile terminal 104 is enabled to receive.

In this method, the service data is sent over a single-bearer network, but other embodiments are suitable for multi-bearer networks, as will be discussed in detail in connection with FIG. 7.

Figure 6:
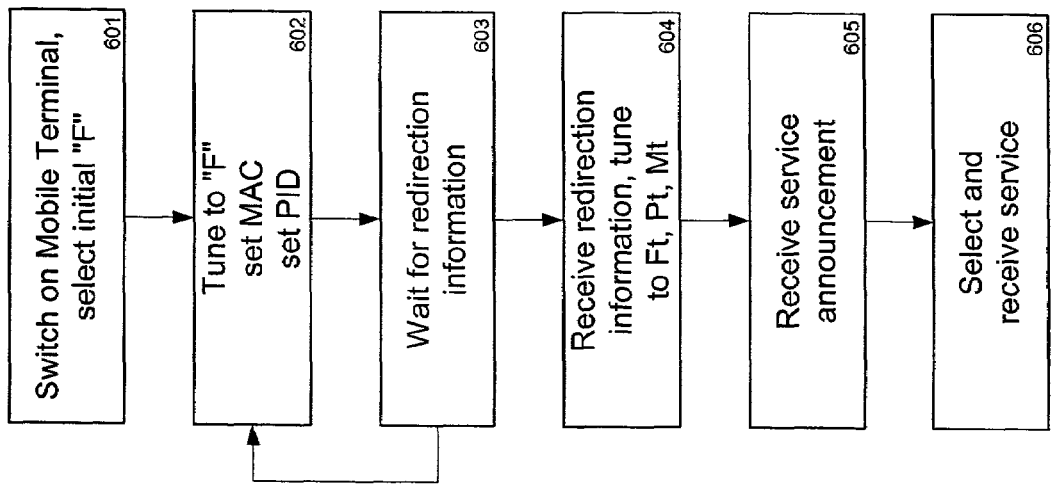
FIG. 6 is a flowchart illustrating an exemplary method by which a mobile terminal identifies service announcements in accordance with one embodiment of the present invention.

FIG. 6 is a flowchart illustrating an exemplary method by which a mobile terminal identifies service announcements in accordance with one embodiment of the present invention, wherein the single-bearer network is a DVB-T network. The mobile terminal 104 is switched on and begins searching for an all-announcement channel by selecting a start frequency, "f" (step 601). The search for this channel can be initiated by the user of the mobile terminal 104 at any time that the mobile terminal 104 is turned on by depressing a service access key, or it may be automatically initiated by the mobile terminal 104, e.g., upon approaching a new coverage area. The mobile terminal 104 then tunes to the frequency f, sets Media Access Control ("MAC") and Program Identifier ("PID") (step 602) and waits for redirection information 503 within a time period, defined to be "$T_1$" (step 603). The time $T_1$ may be defined by default, e.g., in the factory, or a user of the mobile terminal 104 can change the time $T_1$ by changing settings in the mobile terminal 104 using menu commands. The redirection information 503 contains information necessary for the mobile terminal to tune to the all-announcement channel 5001 and receive announcement information. Thus, the redirection information 503 may include the cell location information, cell ID, frequency, PID, MAC, bandwidth, fft, constellation, code rate, guard interval, hierarchy, hierarchical priority, and router address, which describe a DVB-T bearer network uniquely. Additionally, a source authenticator may be included with the redirection information 503. A source authenticator is data that is used to verify the authenticity of a sender. It is typically calculated by taking a secure hash over an entire message, signing the hash by the sender's private (secret) key and appending the result to the end of the original message, as is well known in the art. In the event that the redirection information 503 is not received within the time period $T_1$, then the mobile terminal 104, returning to step 601, tunes to another frequency, and again waits to receive redirection information 503 within a time period $T_1$. Steps 602 and 603 are repeated until redirection information 503 is received within a time period $T_1$ (step 604). Once the redirection information 503 is received, then, in step 604, the mobile terminal 104 tunes to the channel specified by the redirection information 503 as corresponding to the all-announcement channel 5001. The mobile terminal 104 then receives service announcements $A_1$ through $A_X$ (step 605), wherein service announcement $A_1$ identifies the service $S_1$ on channel 1, service announcement $A_2$ identifies the service $S_2$ on channel 2, etc. The user may then tune the mobile terminal 104 to the desired channel, causing the mobile terminal 104 to select specific tuning and filter parameters corresponding to the selected channel, in a manner well known to those skilled in the art. In this manner, the mobile terminal selects and receives the corresponding service available on the selected channel (step 606).

Figure 7:
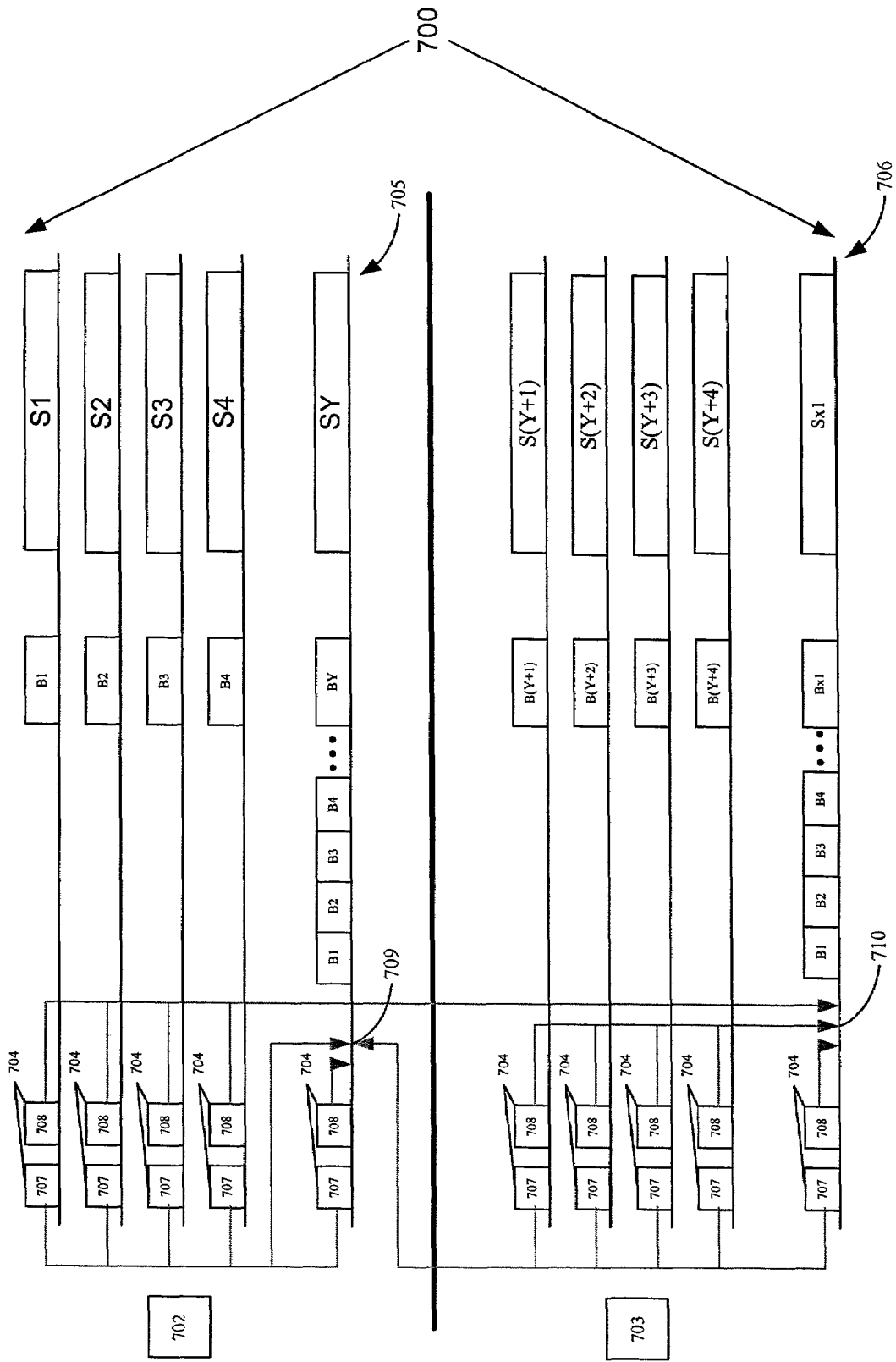
FIG. 7 illustrates the transmission of service announcements over a multi-bearer network in accordance with another embodiment of the present invention.

FIG. 7 illustrates the transmission of service announcements over a multi-bearer network 100 in accordance with one embodiment of the present invention. As shown in FIG. 7, at least a first bearer network 702 and a second bearer network 703 transmit service data to preferably a hybrid mobile terminal 104 capable of receiving service data from the first bearer network 702 and the second bearer network 703. In one embodiment of the invention, the hybrid mobile terminal can comprise two or more receivers corresponding to the bearer-types of the transmitting networks, as will be described hereinafter in connection with FIG. 8. In this embodiment, the first bearer network 702 transmits services using DVB, and the second bearer network 703 transmits services using USTM. However, this is not intended to be limiting. It will be understood that the mobile terminal 104 may be capable of receiving services from more than two bearer networks and that the bearer networks, rather than, or in addition to being, DVB and USTM, may be DAB, GSM, GPRS, UMTS, WLAN, Bluetooth or the like. Services are transmitted from the first and second bearer networks 702 and 703 to the mobile terminal 104 over X1 channels 700. However, some of the X1 channels are dedicated to the transmission of services by the first bearer network 702. These channels are marked in FIG. 7 as 1 through Y. The remainder of the X1 channels are dedicated to the transmission of services by the second bearer network 703. These channels are marked in FIG. 7 as Y+1 through X1. Each channel includes redirection information 704 which is used by the mobile terminal 104 to locate the service announcements $B_1$ through $B_{X1}$ for all X1 channels 700.

In this embodiment, however, there is a first all-announcement channel 705 and a second all-announcement channel 706. The first all-announcement channel 705 contains service announcements $B_1$ through $B_Y$, which correspond to services $S_1$ through $S_Y$ on channels 1 through Y. In other words, the first all-announcement channel 705 includes all service announcements for the transmissions by the first bearer network 702. The second all-announcement channel 706 contains service announcements $B_{(Y+1)}$ through $B_{X1}$, which correspond to services $S_{(Y+1)}$ through $S_{X1}$ on channels Y+1 through X1. In other words, the second all-announcement channel 706 includes all service announcements for the transmissions by the second bearer network 703.

Also in this embodiment, the redirection information 704 comprises a first redirection information 707 and a second redirection information 708. The mobile terminal 104 uses the first redirection information 707 to access the first all-announcement channel 705 (step 709) and also uses the second redirection information 708 to access the second all-announcement channel 706 (step 710). This method enables the mobile terminal 104 to access services provided by a plurality of bearer networks by utilizing an all-announcement channel for each bearer network. Alternatively, it will be appreciated that a single all-announcement channel containing service announcements for all channels of the MBN may be used to quickly identify available services on a plurality of bearer networks.

Figure 8:
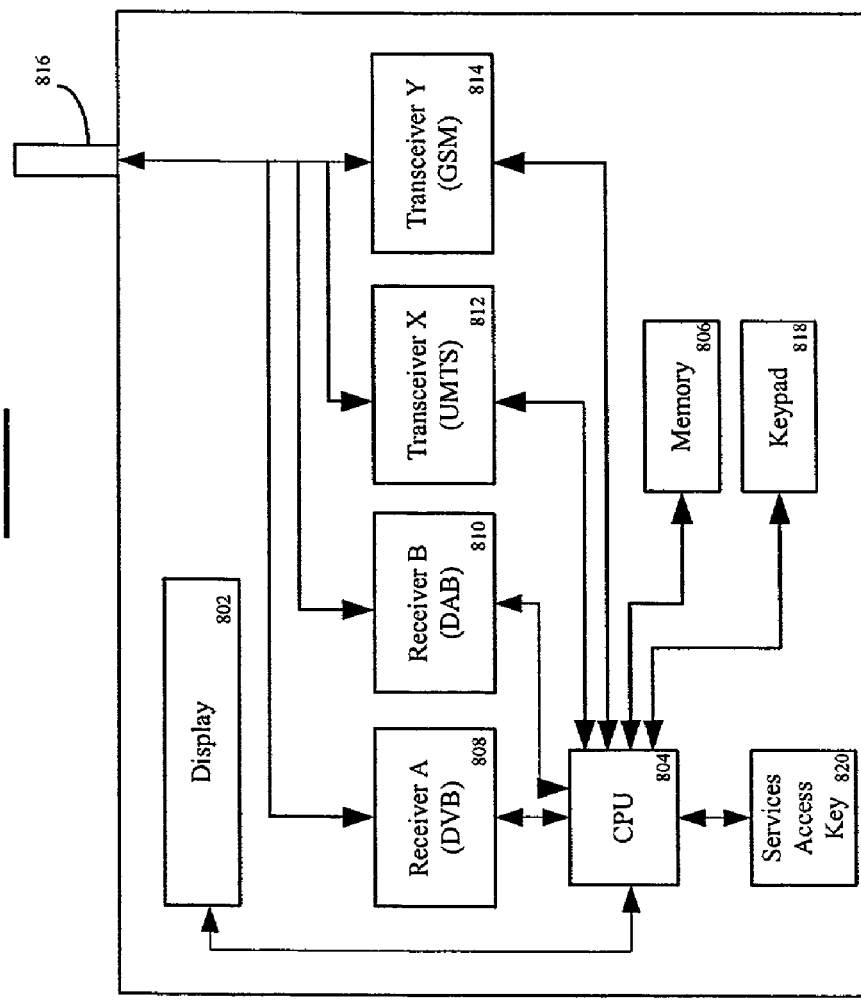
FIG. 8 depicts a block diagram of an exemplary mobile terminal structure for receiving service announcement information over a multi-bearer network.

FIG. 8 depicts a block diagram of an exemplary mobile terminal 800 and, particularly, a mobile phone according to one embodiment of the present invention. As shown, the mobile terminal 800 includes a display 802, such as an LCD display as is known in the art, a central processing unit (CPU) 804 and a memory 806. The mobile terminal also includes at least one receiver (808-814) (for receiving communication from a respective bearer network) connected to an antenna 816 and a keypad 818. The keypad 818 typically includes numerous function keys such as alphanumeric keys and directional (arrow) keys for scrolling among content contained in memory 806 or displayed on the display 802. The mobile terminal 800 also includes one more service access keys, which may be separate from the keypad 818, or part of the keypad 818, for initializing a search for services being transmitted over the various bearer networks, as discussed above in connection with FIG. 6.

It should be understood that the above description is only representative of illustrative examples of embodiments and implementations. For the reader's convenience, the above description has focused on a representative sample of all possible embodiments, a sample that teaches the principles of the present invention. Other embodiments may result from a different combination of portions of different embodiments. The description has not attempted to exhaustively enumerate all possible variations. The alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent.

What is claimed is:

1. A method comprising:
    identifying at least one communication channel that is transmitting signals receivable by a mobile terminal;
    accessing a first communication channel that is transmitting at least one signal receivable by the mobile terminal;
    receiving first signals from the first communication channel;
    searching in the first signals for redirection information;
    selecting and accessing a second communication channel from a plurality of communication channels based on the redirection information, if the redirection information is received within a first period of time; and
    selecting and accessing a third communication channel if the redirection information is not received within the first period of time.

2. The method of claim 1, wherein at least one service announcement for at least one communication channel is transmitted over the second communication channel.

3. The method of claim 2, wherein the second communication channel further transmits at least one service.

4. The method of claim 1, wherein the mobile terminal selects the second communication channel if the redirection information is received within the first period of time, and the mobile terminal is in a selectable mode.

5. The method of claim 1, wherein the mobile terminal selects the second communication channel if the redirection information is received within the first period of time, wherein the first period of time directly follows initializing the mobile terminal.

6. The method of claim 1, wherein the first period of time is determined by a number of the plurality of communication channels.

7. The method of claim 1, wherein the third communication channel is selected randomly from the plurality of communication channels.

8. The method of claim 1, wherein the redirection information is transmitted at a first interval on at least one communication channel.

9. The method of claim 8, wherein the first interval on at least one communication channel does not equal a second interval on at least one other communication channel from the plurality of communication channels, wherein the redirection information is transmitted at the second interval.

10. The method of claim 1, wherein at least one communication channel is a specific frequency.

11. The method of claim 1, wherein the first communication channel is the second communication channel.

12. The method of claim 1, wherein at least one service is transmitted over the first communication channel.

13. A method comprising:
identifying at least one communication frequency that is transmitting signals receivable by a mobile terminal;
accessing a first communication frequency that is transmitting at least one signal receivable by the mobile terminal;
receiving first signals from the first communication frequency;
searching in the first signals for redirection information;
selecting and accessing a second communication frequency from a plurality of communication frequencies based on redirection information, if the redirection information is received within a first period of time; and
selecting and accessing a third communication frequency if the redirection information is not received within the first period of time.

14. The method of claim 13, wherein at least one service announcement for at least one communication frequency is transmitted over the second communication frequency.

15. The method of claim 14, wherein the second communication frequency further transmits at least one service.

16. The method of claim 13, wherein the mobile terminal selects the second communication frequency if the redirection information is received within the first period of time, and the mobile terminal is in a selectable mode.

17. The method of claim 13, wherein the mobile terminal selects the second communication frequency if the redirection information is received within the first period of time, wherein the first period of time directly follows initializing the mobile terminal.

18. The method of claim 13, wherein the first period of time is determined by a number of the plurality of communication frequencies.

19. The method of claim 13, wherein the third communication frequency is selected randomly from the plurality of communication frequencies.

20. The method of claim 13, wherein the redirection information is transmitted at a first interval on at least one communication frequency.

21. The method of claim 20, wherein the first interval on at least one communication frequency does not equal a second interval on at least one other communication frequency from the plurality of communication frequencies, wherein the redirection information is transmitted at the second interval.

22. The method of claim 13, wherein the first communication frequency is the second communication frequency.

23. The method of claim 13, wherein at least one service is transmitted over the first communication frequency.

24. An article of manufacture, comprising:
a computer readable medium including instructions for:
identifying at least one communication channel that is transmitting signals receivable by a mobile terminal;
accessing a first communication channel that is transmitting at least one signal receivable by the mobile terminal;
receiving first signals from the first communications channel;
searching in the first signals for redirection information;
selecting and accessing a second communication channel from a plurality of communication channels based on the redirection information, if the redirection information is received within a first period of time; and
selecting and accessing a third communication channel if the redirection information is not received within the first period of time.

25. An article of manufacture, comprising:
a computer readable medium including instructions for:
identifying at least one communication frequency that is transmitting signals receivable by a mobile terminal;
accessing a first communication frequency that is transmitting at least one signal receivable by the mobile terminal;
receiving first signals from the first communications frequency;
searching in the first signals for redirection information;
selecting and accessing a second communication frequency from a plurality of communication frequencies based on redirection information, if the redirection information is received within a first period of time; and
selecting and accessing a third communication frequency if the redirection information is not received within the first period of time.

26. The method of claim 1, wherein the first period of time is specified by a user of the mobile terminal.

27. The method of claim 1, wherein the first time period is established in the mobile terminal at a time of manufacture.

28. The method of claim 1, wherein the second communication channel includes a service announcement identifying a service transmitted on the first communication channel.

29. The method of claim 1, further comprising:
searching on the third communication channel for redirection information identifying a communication channel on which a service announcement identifying a service transmitted on the first communication channel is located.

30. The method of claim 13, wherein the second communication frequency includes a service announcement identifying a service transmitted on the first communication frequency.

31. The method of claim 13, further comprising:
searching on the third communication frequency for redirection information identifying a communication frequency on which a service announcement identifying a service transmitted on the first communication frequency is located.

32. An apparatus, comprising:
a memory device storing a program; and
a processor configured to communicate with the memory device, the processor operable with the program to:
identify at least one communication channel that is transmitting signals receivable by the apparatus;

access a first communication channel that is transmitting at least one signal receivable by the apparatus;
receive first signals on the first communication channel;
search in the first signals for redirection information;
select and access a second communication channel from a plurality of communication channels based on the redirection information, if the redirection information is received within a first period of time; and
select and access a third communication channel if the redirection information is not received within the first period of time.

33. The apparatus of claim 32, wherein at least one service announcement for at least one communication channel is transmitted over the second communication channel.

34. The apparatus of claim 33, wherein the second communication channel further transmits at least one service.

35. The apparatus of claim 32, wherein the processor is operable with the program to select the second communication channel if the redirection information is received within the first period of time, and the apparatus is in a selectable mode.

36. The apparatus of claim 32, wherein the processor is operable with the program to select the second communication channel if the redirection information is received within the first period of time, wherein the first period of time directly follows initializing the apparatus.

37. The apparatus of claim 32, wherein the first period of time is determined by a number of the plurality of communication channels.

38. The apparatus of claim 32, wherein the third communication channel is selected randomly from the plurality of communication channels.

39. The apparatus of claim 32, wherein the redirection information is transmitted at a first interval on at least one communication channel.

40. The apparatus of claim 39, wherein the first interval on at least one communication channel does not equal a second interval on at least one other communication channel from the plurality of communication channels, wherein the redirection information is transmitted at the second interval.

41. The apparatus of claim 32, wherein at least one communication channel is a specific frequency.

42. The apparatus of claim 32, wherein the first communication channel is the second communication channel.

43. The apparatus of claim 32, wherein at least one service is transmitted over the first communication channel.

44. The apparatus of claim 32, wherein the first period of time is specified by a user of the apparatus.

45. The apparatus of claim 32, wherein the first time period is established in the apparatus at a time of manufacture.

46. The apparatus of claim 32, wherein the second communication channel includes a service announcement identifying a service transmitted on the first communication channel.

47. The apparatus of claim 32, wherein the processor is further operable with the program to:
search on the third communication channel for redirection information identifying a communication channel on which a service announcement identifying a service transmitted on the first communication channel is located.

48. An apparatus, comprising:
a memory device storing a program; and
a processor configured to communicate with the memory device, the processor operable with the program to:
identify at least one communication frequency that is transmitting signals receivable by the apparatus;
access a first communication frequency that is transmitting at least one signal receivable by the apparatus;
receive first signals on the first communication frequency;
search in the first signals for redirection information;
select and access a second communication frequency from the plurality of communication frequencies based on redirection information, if the redirection information is received within a first period of time; and
select and access a third communication frequency if the redirection information is not received within the first period of time.

49. The apparatus of claim 48, wherein at least one service announcement for at least one communication frequency is transmitted over the second communication frequency.

50. The apparatus of claim 49, wherein the second communication frequency further transmits at least one service.

51. The apparatus of claim 48, wherein the processor is further operable with the program to select the second communication frequency if the redirection information is received within the first period of time, and the apparatus is in a selectable mode.

52. The apparatus of claim 48, wherein the processor is further operable with the program to select the second communication frequency if the redirection information is received within the first period of time, wherein the first period of time directly follows initializing the apparatus.

53. The apparatus of claim 48, wherein the first period of time is determined by a number of the plurality of communication frequencies.

54. The apparatus of claim 48, wherein the third communication frequency is selected randomly from the plurality of communication frequencies.

55. The apparatus of claim 48, wherein the redirection information is transmitted at a first interval on at least one communication frequency.

56. The apparatus of claim 55, wherein the first interval on at least one communication frequency does not equal a second interval on at least one other communication frequency from the plurality of communication frequencies, wherein the redirection information is transmitted at the second interval.

57. The apparatus of claim 48, wherein the first communication frequency is the second communication frequency.

58. The apparatus of claim 48, wherein at least one service is transmitted over the first communication frequency.

59. The apparatus of claim 48, wherein the second communication frequency includes a service announcement identifying a service transmitted on the first communication frequency.

60. The apparatus of claim 48, wherein the processor is further operable with the program to:
search on the third communication frequency for redirection information identifying a communication frequency on which a service announcement identifying a service transmitted on the first communication frequency is located.

61. The article of manufacture of claim 24, wherein the second communication channel includes a service announcement identifying a service transmitted on the first communication channel.

62. The article of manufacture of claim 24, the computer readable medium further including instructions for:
searching on the third communication channel for redirection information identifying a communication channel on which a service announcement identifying a service transmitted on the first communication channel is located.

63. The article of manufacture of claim 25, wherein the second communication frequency includes a service announcement identifying a service transmitted on the first communication frequency.

64. The article of manufacture of claim 25, the computer readable medium further including instructions for:

searching on the third communication frequency for redirection information identifying a communication frequency on which a service announcement identifying a service transmitted on the first communication frequency is located.

\* \* \* \* \*

UNITED STATES PATENT AND TRADEMARK OFFICE
CERTIFICATE OF CORRECTION

PATENT NO. : 7,426,393 B2 Page 1 of 1
APPLICATION NO. : 09/988921
DATED : September 16, 2008
INVENTOR(S) : Toni Paila It is certified that error appears in the above-identified patent and that said Letters Patent is hereby corrected as shown below:

On the cover page, item (73) Assignee:, change "Epsoo" to --Espoo--.

Signed and Sealed this

Thirteenth Day of January, 2009

JON W. DUDAS
*Director of the United States Patent and Trademark Office*